United States Patent Office 3,642,744
Patented Feb. 15, 1972

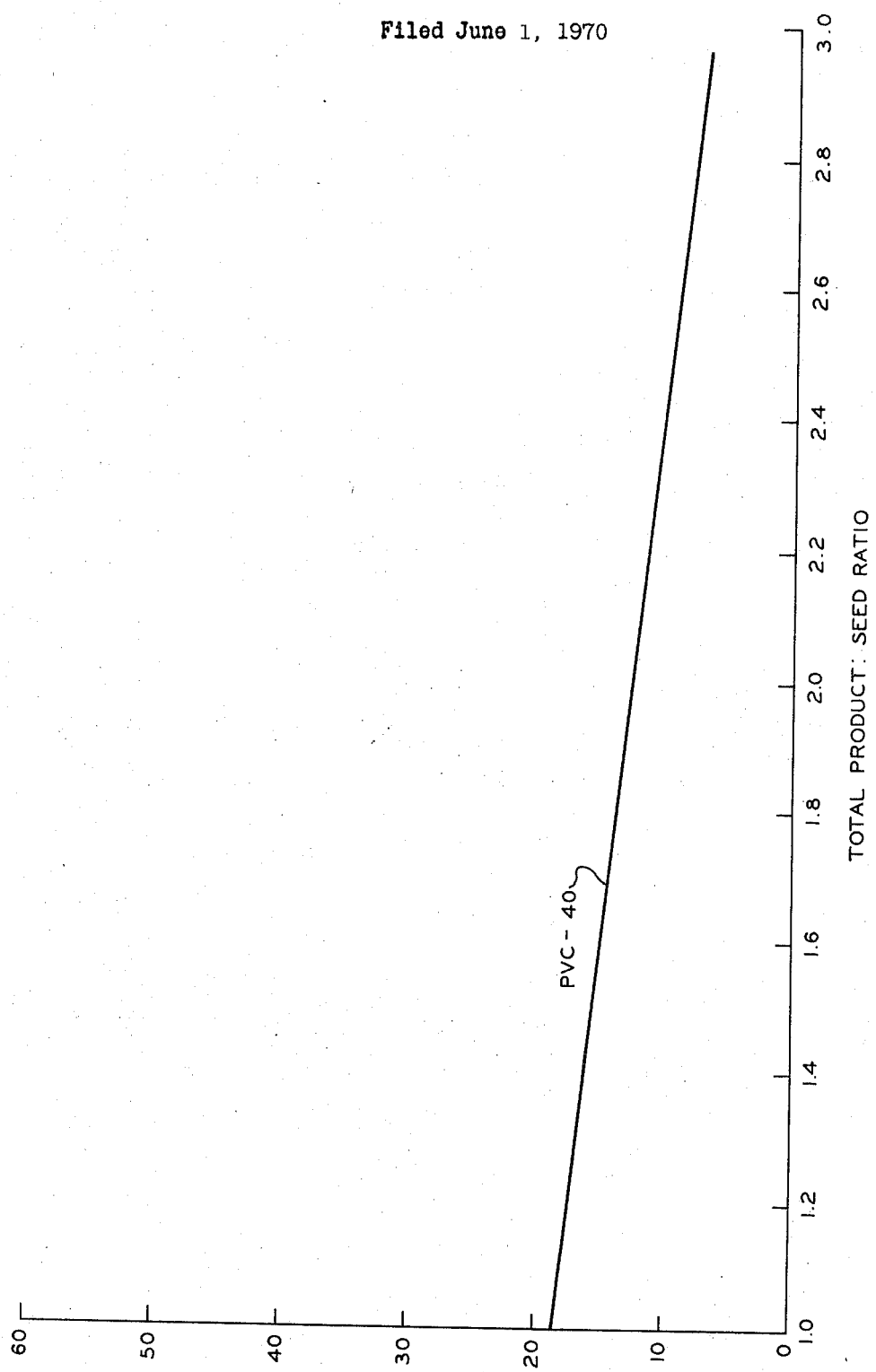

3,642,744
VINYL MONOMER POLYMERIZATION PROCESS
Charles W. Moberly and Gerald R. Kahle, Bartlesville, Okla., assignors to Phillips Petroleum Company
Filed June 1, 1970, Ser. No. 42,093
Int. Cl. C08f 1/04, 3/30
U.S. Cl. 260—87.5
14 Claims

ABSTRACT OF THE DISCLOSURE

Vinyl polymers having improved porosity are obtained by vapor phase polymerization of vinyl monomer in the presence of a polymerization initiator, seed polymer and a minor amount of certain porosity modifiers.

---

This invention relates to the polymerization of polymerizable unsaturated monomers. Particularly, the invention relates to the polymerization of vinyl monomers, especially to the polymerization in the vapor phase of vinyl chloride alone or with copolymerizable monomers, for obtaining polymers and copolymers having improved processing properties.

Vinyl polymers such as polyvinyl chloride are well known articles of commerce. Processes for producing such polymers include bulk polymerization wherein the polymerization is conducted in the liquid phase in the absence of a substantial amount of solvent or diluent by merely adding an oil-soluble polymerization catalyst to the liquid monomer or liquid mixture of monomers; solution polymerization wherein a solvent for the polymer product is added to the polymerization zone; emulsion polymerization wherein the charge to the reaction zone comprises liquid vinyl monomer or monomers, water-soluble polymerization catalyst, water and a water-soluble emulsifying agent; and suspension polymerization wherein a charge comprising an oil phase consisting of an oil-soluble catalyst and liquid monomer or monomers dispersed in an aqueous phase consisting of water, suspending agents, wetting agents and coagulation agents is polymerized under conditions of vigorous agitation.

Of these four systems, bulk polymerization is the oldest and simplest. Generally, equipment used for bulk polymerizations is simpler and less costly as there is neither water nor solvent to be separated. The polymeric products generally have a high purity with good heat stability and excellent transparency; and the polymer beads have a preferred structure since the mechanism of association between the chains of the high polymers is different in the absence of any emulsifier or protective colloid. Notwithstanding these advantages, bulk polymerizations of vinyl monomers have been restricted to laboratory and research investigations with the majority of commercial polymerizations being effected by either emulsion or suspension polymerization systems, since with bulk polymerizations, the degree of conversion of the monomer to polymer is limited by the fact that the polymerization reaction yields a thick paste or slurry and the homogeneity of the product decreases as the mass thickens and increasing conversion results in decreasing ability to maintain the agitation upon which homogeneity depends. In addition, the vinyl polymerization is an exothermic reaction and, in the thickened condition of the reaction mass, removal of the reaction heat is most difficult. Thus, commercial polymerizations have been predominantly effected by emulsion and suspension polymerization since dispersions of solid polymers in water are easy to agitate and the water serves as a thermal buffer permitting more effective dissipation of the heat given off in the course of the polymerization reaction.

Recently, it has been found that vinyl monomers can be commercially polymerized in the vapor phase. This technique involves the polymerization of vinyl compounds and mixtures thereof in the presence of a polymerization catalyst and in the absence of any substantial amount of diluent, under conditions of pressure and temperature such that the polymerization is effected in the vapor phase. A preferred embodiment effects the vinyl polymerization reaction at conditions under which the monomer is in the vapor state in the presence of polymer particles as seed. The vapor phase polymerization can be effected in a single-stage fluidized bed reaction zone wherein a charge comprising liquid vinyl monomer or monomers, and monomer-soluble polymerization catalyst is introduced into a reaction zone together with vaporized monomer. The vaporized monomer serves to aerate or fluidize the reaction zone; and, as polymer begins to form, it is maintained in a fluidized condition by the vaporized monomer and serves as seed for the propagation of the polymerization reaction.

A modification of the vapor phase polymerization utilizes a liquid phase agitated reactor and a gas-fluidized vapor phase reactor in series. In such a system it is often desirable to utilize the liquid phase reactor to produce polymer which acts as a solid support for any catalyst remaining from the liquid phase reactor and for additional catalyst introduced into the fluidized bed vapor phase reactor as well as seed for the propagation of the polymerization taking place in the vapor phase.

A further modification which provides a more uniform product comprises screening the reaction effluent from the fluidized bed reaction zone to remove polymer particles having undesirable particle size. The particles which are too large are passed to a grinder to produce new seed polymer. Particles which are smaller than the desired product particle size can be returned to the reaction zone directly or admixed with new polymer particles for impregnation with catalyst. The catalyst impregnated seed particles are then returned to the vapor phase reaction zone. The term "impregnate," "impregnation," and the like as used herein shall be understood to mean addition of additive to polymer particles by any means known to the industry, as by spraying, dipping, and the like.

The base resin resulting from the vapor phase polymerization of vinyl monomers is a generally satisfactory material well suited for operations such as molding, pressing or extruding. For many uses, these resins must be plasticized before being used. However, at desirably high productivity ratios, i.e., ratio of total polymer product to seed polymer, the vapor phase polymerization products exhibit a densely packed structure having an undesirably low porosity which deleteriously inhibits plasticizer absorption. Vinyl polymers having high porosity are generally considered to be more easily fluxed and processed during addition of processing aids, lubricants and stabilizers. Generally, high plasticizer absorption is desirable for making dry blends of plasticized vinyl polymers. Thus, vinyl polymers are desirable which readily absorb plasticizer compounds. Mere adsorption of this plasticizer on the polymer surface is insufficient. Plasticization of low porosity polymers is ineffective since such polymers do not absorb plasticizer rapidly and evenly, and this frequently results in a nonhomogeneous end product. Modification of polymerization conditions, e.g., reaction time, etc., either fails to improve polymer porosity or deleteriously affects process economics.

It has now been discovered that the porosity of vinyl polymers produced by catalytic vapor phase polymerization of vinyl monomers such as vinyl chloride is unexpectedly substantially improved when the polymerization is effected in accordance with this invention. Thus, in accordance with this invention, vinyl polymers of good porosity and plasticizer absorption are prepared by a process wherein a vinyl monomer is polymerized, or copolymerized with other monomers, in the substantial absence of solvent or diluent, in the presence of a vinyl polymerization initiator and minor amounts of certain porosity modifiers, hereinafter described in greater detail, and the thus-formed polymer is recovered. In a preferred embodiment, the vapor phase polymerization is effected in the presence of seed polymer. Preferably, the amount of seed polymer is in the range of 15 to 60 weight percent, based on weight of total polymer product.

The porosity modifiers which are employed in the practice of this invention comprise at least one compound selected from the group consisting of (1) carboxylic acids having the formula $YR_mCO_2H$, where Y is selected from the group consisting of cyano and carboxy; R is selected from the group consisting of alkylene, monohydroxyalkylene, dihydroxyalkylene, trihydroxyalkylene, monocarboxalkylene, monocarboxymonohydroxyalkylene, and monocarboxydihydroxyalkylene, not more than one hydroxy group being attached to any one carbon atom; $m$ is 0 or 1 when Y is carboxy and 1 when Y is cyano; and the number of carbon atoms in each molecule of said carboxylic acids is within the range of 2 to 8, inclusive; (2) alkali metal and alkaline earth metal salts of said carboxylic acids, including the acid salts and mixed metal salts of those of said carboxylic acids which are polycarboxylic acids; (3) alkali metal and alkaline earth metal carbonates, including mixed metal carbonates; (4) alkali metal bicarbonates; and (5) mixtures thereof.

Examples of porosity modifiers which can be used in the process of this invention include oxalic acid, malonic acid, succinic acid, adipic acid, suberic acid, malic acid, tartaric acid, citric acid, 2,3,4-trihydroxyglutaric acid, cyanoacetic acid, 2-cyanobutyric acid, 3-cyano-2-hydroxyheptanoic acid, 2-cyanoglutaric acid, 2-cyano-3,4-dihydroxyglutaric acid, calcium malonate, potassium citrate, barium cyanoacetate, sodium oxalate, strontium tartrate, lithium malate, beryllium succinate, magnesium citrate, sodium suberate, calcium 5-cyano-3-hydroxyheptanoic acid, rubidium acid malonate, sodium potassium tartrate, calcium carbonate, cesium carbonate, sodium potassium carbonate, sodium bicarbonate, and the like, and mixtures thereof.

Preferred porosity modifiers include malonic acid, citric acid, cyanoacetic acid, oxalic acid, tartaric acid, malic acid and succinic acid; the alkali metal and alkaline earth metal salts of these carboxylic acids, including the acid salts and mixed metal salts of these acids which are polycarboxylic acids; the alkali metal and alkaline earth metal carbonates, including mixed metal carbonates; and the alkali metal bicarbonates.

A particular feature of the invention is that substantial improvement in porosity is obtained at negligible expense to process productivity by the use of minor amounts of porosity modifier. Generally, from about 0.01 to about 5 weight percent, based on the weight of total polymer product, is effective in obtaining vinyl resins having good porosity, i.e., plasticizer absorption, characteristics. Preferably, the porosity modifiers are incorporated into the polymerization recipes in an amount of from 0.1 to 2 weight percent, based on the weight of total polymer product. As noted, mixtures of the modifiers can be used.

An important feature of the invention is the requirement that the porosity modifiers must be added to the polymerization recipes before termination of the vapor phase polymerization reaction. Thus, when using a single-stage fluidized bed reaction zone, the modifiers can be added as a separate stream, in admixture with the catalyst stream or in admixture with the seed polymer stream to the polymerization reaction zone. In the case of staged liquid phase bulk polymerization-vapor phase bulk polymerizations, the modifiers are preferably added to the liquid phase reaction zone in which the seed polymer is prepared.

The polymers of vinyl chloride whose properties are improved by use of the process of this invention include poly(vinyl chloride) and copolymers of vinyl chloride and polymerizable monomers, e.g., vinyl esters such as vinyl acetate, vinyl butyrate, and vinyl stearate; vinyl ethers such as vinyl lauryl ether and vinyl cetyl ether; olefins such as ethylene and propylene; and halogenated olefins such as vinylidene chloride, tetrafluoroethylene, and perfluoropropylene. Generally, the monomer charge comprises from 75 to 100 weight percent vinyl chloride and 25 to 0 weight percent of at least one comonomer.

The polymerization initiators suitable for use in the practice of the invention can be any of the known catalysts for the polymerization of vinyl-type monomers. Preferred polymerization initiators are free radical precursors such as perhaloethanes, such as 1,1-dichloro-1,2,2,2-tetrabromoethane; organic peroxides such as dimethyl peroxide, dicyclohexyl peroxide, diphenyl peroxide, bis($\alpha,\alpha$-diisopropyl-4-ethylbenzyl) peroxide, and acetyl cyclohexane sulfonyl peroxide; dialkyl peroxydicarbonates such as diisopropyl peroxydicarbonate, di(2-ethylhexyl) peroxydicarbonate and di(sec-butyl) peroxydicarbonate; azo compounds such as disclosed in U.S. Pats. 2,471,959 and 2,520,338; azoamidine compounds such as disclosed in U.S. Pat. 2,599,300; and cyclic amidines such as azobis-N,N'-methylene isobutyramide monoacetate. Suitable additional free radical precursors are listed, for example, in Faraday Society, "Symposium on Free Radicals," London, 1953, and Ingram, "Free Radicals," Academic Press, Inc., New York, 1958. The dialkyl peroxydicarbonates have been found to be particularly useful initiators for the polymerization of vinyl monomers, with diisopropyl peroxydicarbonate being presently preferred because of its reactivity. Preparation of a number of peroxydicarbonates is described in U.S. Pats. 2,370,588 and 2,464,012, which are incorporated herein by reference.

Referring now to the drawing, FIG. 1 is a representation of the effect of process productivity upon plasticizer absorption. The values for the curve of FIG. 1 are obtained from the data of Example I and demonstrate the decrease in plasticizer absorption which occurs as productivity increases.

EXAMPLE I

The effect of process productivity, i.e., the ratio of total polymer product (new polymer and seed polymer) to seed polymer, on plasticizer absorption is shown in Table I and FIG. 1. In each run, vinyl chloride was polymerized in the vapor phase, at 140° F. and 115 p.s.i.g., in the presence of seed polymer, using diisopropyl peroxydicarbonate as polymerization initiator at a residence time of 1½ hours. The plasticizer absorption of the product polymer was determined by stirring 50 grams of polyvinyl chloride in di-2-ethylhexyl phthalate (DOP) for three minutes and filtering under vacuum for 45 minutes. The increase in weight is recorded as the plasticizer absorption and is related to polymer porosity. As shown in FIG. 1, plasticizer absorption decreases with increasing productivity.

TABLE I

| Run | Seed polymer | Productivity ratio | Plasticizer absorption, g. DOP/50 g. PVC |
|---|---|---|---|
| 1 | PVC-40* | 1.00 | 18.5 |
| 2 | PVC-40 | 1.72 | 14.8 |
| 3 | PVC-40 | 2.00 | 13.2 |
| 4 | PVC-40 | 2.36 | 10.4 |
| 5 | PVC-40 | 2.42 | 9.5 |

*Trademark of Diamond Shamrock Corporation commercial polyvinyl chloride resin.

EXAMPLE II

The improvement in porosity at high productivity ratios afforded by the invention is shown in Table II. In each run, vinyl chloride was polymerized in the vapor phase at 140° F. (unless otherwise specified) and 115 p.s.i.g., using 0.07 g. of diisopropyl peroxydicarbonate as polymerization initiator at a residence time of 1½ hours. In each run, the porosity modifier was mixed with 100 grams PVC-40 polyvinyl chloride seed polymer prior to introduction into the vapor phase polymerization reaction zone. The plasticizer absorption was determined as in Example I. The theoretical plasticizer absorption is the amount of plasticizer absorbed by unmodified polymer at a specific productivity ratio and is taken from the PVC–40 resin productivity curve of FIG. 1.

TABLE II

| Run | Porosity modifier | Amount, grams | Productivity ratio | Plasticizer absorption, g. DOP/ 50 g. PVC | | |
|---|---|---|---|---|---|---|
| | | | | Theoretical | Actual | Percent increase |
| 6 | Sodium bicarbonate | 0.5 | 2.50 | 9.7 | 12.2 | 26 |
| 7 | Sodium potassium tartrate | 2.5 | 2.52 | 9.6 | 12.3 | 28 |
| 8 | Sodium oxalate | 1.0 | 2.37 | 10.5 | 12.0 | 14 |
| 9 | Calcium malonate/dibutyltin dilaurate | 1.0/2.0 | 1.90 | 13.5 | 13.5 | 0 |
| 10 | Citric acid | 1.0 | 2.05 | 12.5 | 13.5 | 8 |
| 11 | Malonic acid (130° F.) | 1.0 | 2.00 | 12.6 | 15.8 | 25 |
| 12 | Malonic acid (140° F.) | 1.0 | 2.31 | 10.7 | 16.0 | 50 |
| 13 | Malonic acid/dibutyltin dilaurate (150° F.) | 1.0/2.0 | 2.04 | 12.3 | 14.7 | 21 |
| 14 | Cyanoacetic acid | 1.0 | 1.94 | 12.9 | 14.3 | 11 |
| 15 | Dibutyltin dilaurate | 2.0 | 1.93 | 12.8 | 11.9 | (7) |

Run 15 is a comparative run not in accordance with the invention. Additives such as dibutyltin dilaurate exhibit a negative effect on plasticizer absorption whereas the porosity modifiers of the invention substantially improve plasticizer absorption.

Reasonable variations and modifications are possible within the foregoing disclosure.

We claim:

1. A process for preparing vinyl polymers which comprises subjecting to vapor phase polymerization conditions from 75 to 100 weight percent of vinyl chloride and from 0 to 25 weight percent of at least one other monomer copolymerizable with vinyl chloride in said vapor phase polymerization, in a substantially solvent-free or diluent-free environment, with a monomer soluble free radical polymerization initiator and in the presence of at least one porosity modifier selected from the class consisting of (1) carboxylic acids having the formula $YR_mCO_2H$, where Y is selected from the group consisting of cyano and carboxy; R is selected from the group consisting of alkylene, monohydroxyalkylene, dihydroxyalkylene, trihydroxyalkylene, monocarboxyalkylene, monocarboxymonohydroxyalkylene, and monocarboxydihydroxyalkylene, not more than one hydroxy group being attached to any one carbon atom; $m$ is 0 or 1 when Y is carboxy and 1 when Y is cyano; and the number of carbon atoms in each molecule of said carboxylic acids is within the range of 2 to 8, inclusive; (2) alkali metal and alkaline earth metal salts of said carboxylic acids, including the acid salts and mixed metal salts of those of said carboxylic acids which are polycarboxylic acids; (3) alkali metal and alkaline earth metal carbonates, including mixed metal carbonates; (4) alkali metal bicarbonates; and (5) mixtures thereof.

2. A process according to claim 1 wherein said porosity modifier is selected from the class consisting of malonic acid, citric acid, cyanoacetic acid, oxalic acid, tartaric acid, malic acid, and succinic acid; the alkal metal and alkaline earth metal salts of these carboxylic acids, including the acid salts and mixed metal salts of these acids which are polycarboxylic acids; the alkali metal and alkaline earth metal carbonates, including mixed metal carbonates; and the alkali metal bicarbonates.

3. A process according to claim 2 wherein said alkali metal and alkaline earth metal compound is selected from the class consisting of calcium carbonate, sodium bicarbonate, calcium malonate, potassium citrate, barium cyanoacetate, sodium oxalate, strontium tartrate, lithium malate, beryllium succinate, magnesium citrate, rubidium acid malonate, cesium carbonate or sodium potassium tartrate.

4. A process according to claim 2 wherein said amount of said porosity modifier is in the range of about 0.01 to about 5 weight percent, based on weight of total polymer product.

5. A process according to claim 4 wherein said amount of porosity modifier is in the range of 0.1 to 2 weight percent, based on weight of total polymer product.

6. A process for preparing vinyl polymers comprising the steps of polymerizing under liquid phase polymerization conditions in a substantially solvent-free or diluent-free environment a monomer charge comprising from 75 to 100 weight percent of liquid vinyl chloride and from 0 to 25 weight percent of a least one compound copolymerizable with vinyl chloride under the polymerization conditions;

in the presence of a vinyl monomer soluble polymerization initiator, and at least one porosity modifier selected from the class consisting of (1) carboxylic acids having the formula $YR_mCO_2H$, where Y is selected from the group consisting of cyano and carboxy; R is selected from the group consisting of alkylene, monohydroxyalkylene, dihydroxyalkylene, trihydroxyalkylene, monocarboxyalkylene, monocarboxymonohydroxyalkylene, and monocarboxydihydroxyalkylene, not more than on hydroxy group being attached to any one carbon atom; $m$ is 0 or 1 when Y is carboxy and 1 when Y is cyano; and the number of carbon atoms in each molecule of said carboxylic acids is within the range of 2 to 8, inclusive; (2) alkali metal and alkaline earth metal salts of said carboxylic acids, including the acid salts and mixed metal salts of those of said carboxylic acids which are polycarboxylic acids; (3) alkali metal and alkaline earth metal carbonates, including mixed metal carbonates; (4) alkali metal bicarbonates; and (5) mixtures thereof;

subjecting the thus-formed reaction mixture comprising vinyl polymer and unreacted monomer to vapor phase polymerization conditions in a substantially solvent-free or diluent-free environment; and recovering polymer product.

7. A process according to claim 6 wherein said porosity modifier is selected from the class consisting of malonic acid, citric acid, cyanoacetic acid, oxalic acid, tartaric acid, malic acid, and succinic acid; the alkali metal and alkaline earth metal salts of these carboxylic acids, including the acid salts and mixed metal salts of these acids which are polycarboxylic acids; the alkali metal and alkaline earth metal carbonates, including mixed metal carbonates; and the alkali metal bicarbonates.

8. A process according to claim 7 wherein said porosity modifier is selected from the class consisting of calcium carbonate, sodium bicarbonate, calcium malonate, potassium citrate, barium cyanoacetate, sodium oxalate, strontium tartrate, lithium malate, beryllium succinate, magnesium citrate, rubidium acid malonate, cesium carbonate or sodium potassium tartrate.

9. A process according to claim 7 wherein the amount of vinyl polymer charged to said vapor phase polymerization step is in the range of 15 to 60 weight percent, based on weight of ultimate polymer product.

10. A process according to claim 7 wherein said porosity modifier is present in an amount of 0.01 to 5 weight percent, based on weight of ultimate polymer product.

11. A process according to claim 9 wherein the amount of porosity modifier is in the range of 0.1 to 2 weight percent.

12. A process according to claim 8 wherein said porosity modifier is sodium bicarbonate.

13. A process according to claim 8 wherein said porosity modifier is sodium potassium tartrate.

14. A process according to claim 8 wherein said porosity modifier is malonic acid.

References Cited

UNITED STATES PATENTS 2,600,695  6/1952  Sans _____ 260—92.8

JOSEPH L. SCHOFER, Primary Examiner

J. A. DONAHUE, Jr., Assistant Examiner

U.S. Cl. X.R.

260—87.1, 87.5 A, 87.5 C, 87.5 G, 87.7, 92.8